United States Patent

Martin

Patent Number: 5,835,187
Date of Patent: Nov. 10, 1998

[54] ASPHERIC MULTIFOCAL CONTACT LENS HAVING CONCENTRIC FRONT SURFACE

[75] Inventor: Richard R. Martin, Honeoye Falls, N.Y.

[73] Assignee: Wilmington Partners L.P., Wilmington, Mass.

[21] Appl. No.: 755,084

[22] Filed: Nov. 22, 1996

[51] Int. Cl.⁶ .................................................. G02V 7/04
[52] U.S. Cl. ................. 351/161; 351/160 H; 351/160 R
[58] Field of Search .......................... 351/160 H, 160 R, 351/161, 162

[56] References Cited

U.S. PATENT DOCUMENTS

| | | | |
|---|---|---|---|
| 4,765,728 | 8/1988 | Porat et al. | 351/161 |
| 4,838,674 | 6/1989 | Dufour | 351/169 |
| 4,861,152 | 8/1989 | Vinzia et al. | 351/161 |
| 4,890,913 | 1/1990 | De Carle | 351/161 |
| 5,125,729 | 6/1992 | Mercure | 351/161 |
| 5,166,710 | 11/1992 | Höfer et al. | 351/160 R |
| 5,181,053 | 1/1993 | Brown | 351/161 |
| 5,349,395 | 9/1994 | Stoyan | 351/161 |
| 5,436,678 | 7/1995 | Carroll | 351/161 |
| 5,507,979 | 4/1996 | Roffman et al. | 264/1.8 |

FOREIGN PATENT DOCUMENTS 2059102  9/1980  United Kingdom.

Primary Examiner—Frank G. Font
Assistant Examiner—Jason D. Vienrra-Eisenberg
Attorney, Agent, or Firm—Chris P. Konkol; John E. Thomas

[57] ABSTRACT

The present invention relates to a multifocal contact lens having an edge, a front and back side and a series of concentrically arranged zones comprising central zone, a marginal zone and a peripheral zone. Each of the zones on the back side of the lens is defined by a second-order surface of revolution other than spherical. The front side of the lens comprises multiple spherical surfaces for providing increasing power correction from the central zone toward the peripheral zone.

5 Claims, 1 Drawing Sheet

ASPHERIC MULTIFOCAL CONTACT LENS HAVING CONCENTRIC FRONT SURFACE

FIELD OF THE INVENTION

The present invention generally relates to concentric multifocal contact lenses. The subject lens utilizes a combination of aspherical curves on the back side of the lens with spherical curves on the front surface of the lens to provide better fit and centering while offering greater power correction.

BACKGROUND

Multifocal contact lenses are well known and include a variety of designs for providing multiple focal points. One popular design provides concentric rings or zones on either the front or back surface of the lens. Examples of such lenses are provided in U.S. Pat. Nos. 5,507,979; 5,349,395; 5,270,744; 5,181,053; 5,125,729; 4,890,913; 4,861,152; 4,838,674 and UK Patent Application 2,059,102, all of which are incorporated herein by reference. These type of lenses are sometimes referred to as a "simultaneous" multifocal lense and may have either a circular near zone surrounded by an annular distance zone (center-near) or the reverse (center-far).

Aspherical concentric multifocal lenses have an increasingly flatter curve from the center to the edge of the lens. This aspherical curve may appear on either the back or front side of the lens, although it typically appears on the back side. The flattening of the back surface on these lenses within the optical zone (region) produces the multifocal power in conjunction with the refractive index difference between the tear film and the lens material. An example of such a lens is provided in U.S. Pat. No. 5,436,678 to Carroll which is incorporated herein by reference. This reference discloses a lens having a multi-aspherical back surface having a concentrically arranged central zone, a marginal zone and a peripheral zone wherein each of the zones is constituted by portions of aspherical second-order surfaces of revolution. This lens reduces the need for steep fitting and offers many other advantages including good centering. One drawback to this design, however, is that it can be difficult to provide sufficient power correction toward the periphery of the lens without compromising fit.

The use of multiple surfaces on either or both the front and back sides of lenses is known. For example, lens designs are known which provide multiple spherical surfaces on the front side of the lens. Unfortunately, such designs are very limited as it is difficult to provide sufficient power correction without "vision jumps" between spherical surfaces. Other lens designs have included the use of aspherical curves on both the front and back sides of a lens. This practice has also been limited as the use of aspherical curves on both the front and back sides of a lens tends to reduce vision acuity beyond an acceptable range.

Thus, it is desired to provide a multifocal lens having the centering and fit characteristics of the lens described in U.S. Pat. No. 5,436,678, while also providing increased power correction, particularly toward the periphery of the lens.

SUMMARY OF THE INVENTION

The present invention is multifocal contact lens which provides excellent fit and centering characteristics while also providing increased power correction by utilizing multiple surfaces on both the front and back sides of the contact lens. The subject multifocal contact lens has an edge, a front and back side and a series of concentrically arranged zones comprising central zone, a marginal zone and a peripheral zone. Each of the zones on the back side of the lens is defined by a second-order surface of revolution other than spherical, and the front side comprises multiple spherical surfaces for providing increasing power correction from the central zone toward the peripheral zone.

DETAILED DESCRIPTION OF THE INVENTION

Figure 1:
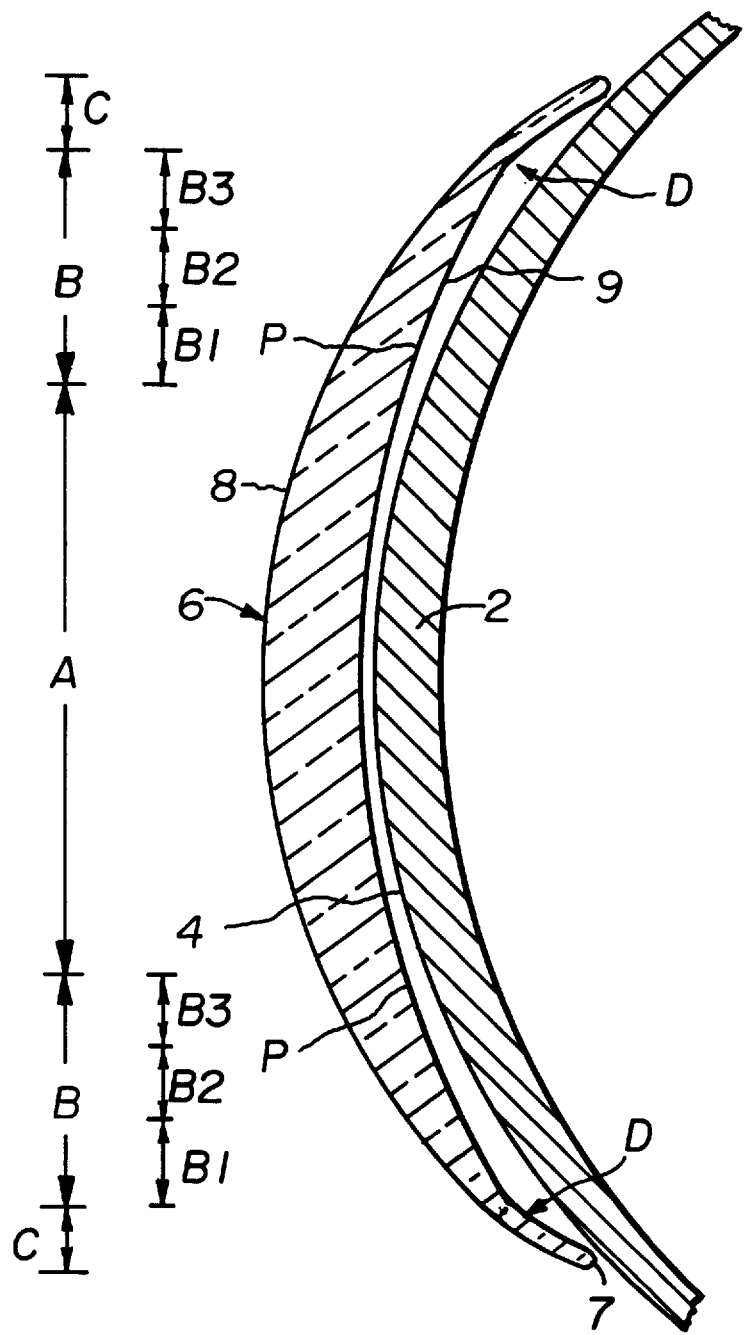
FIG. 1 is an enlarged cross-sectional view showing the fit between a cornea and a contact lens of the present invention.

The present invention is directed toward contact lenses and includes: introcular lenses, scleral lenses, and corneal lenses. Such lenses may include hard, rigid gas permeable, and soft lenses, although a preferred embodiment of the invention relates to rigid gas permeable (RGP) lenses including those produced from fluoro silicone acrylate materials.

The contact lenses of the present invention may be made using a variety of well known methods including various molding and lathe cutting techniques. In a preferred embodiment, lenses are cut from contact lens blanks, or "buttons" (such as Boston ES™ from Polymer Technology), using a CNC lathe system. Such lathe systems include a data processing system capable of calculating curves corresponding to a desired lens surface, typically based upon inputted lens design parameters. A description of such a system is provided in U.S. Pat. No. 5,452,031 to Ducharme, which is incorporated herein by reference. With such systems, an operator typically inputs lens design parameters into the system by way of an input means (e.g. such as a keyboard, disk, modem, or other similar means used to download information to a processing unit). Using the inputted lens design parameters, a central processing unit (or similar means) calculates a lens surface using a set of pre-programmed algorithms. Once the shape of the lens is defined, a corresponding surface is cut into the button by way of a computer driven lathe.

With using the various aspherical surfaces described above with respect to the back side of the lens, it has been found that some applications require additional power correction which can not be obtained without compromising fit. This problem has been solved by the use of multiple spherical surfaces on the front side of the lens in combination with the aforementioned aspherical back side surface. Although the use of multiple spherical surfaces has been disfavored due to the significant "vision jumps" noticeable between such surfaces, these "vision jumps" are minimized in the present invention by combining the spherical surfaces on the front side of the lens with a back surface including aspherical surfaces. Because power correction is generated at both the front and back sides of the lens, the surfaces provided on each side of the lens need not be as extreme as if only one surface was used for providing power correction. Consequently, fewer spherical surfaces are required on the front surface of the lens, thus reducing noticeable jumps in vision ("vision jumps"). Furthermore, as less power correction is required on the back side of the lens, more consideration can be given to fit and centering characteristics.

Referring to FIG. 1, there is provided a cross sectional view of a cornea (2) with its surface (4) adjacent to the back surface of the subject lens (6). The lens (6) has an edge (7), a front side (8), a back side (9) and three concentric zones comprising: a central zone (A), a marginal zone (B) located about the circumference of the central zone, and a peripheral zone (C) located about the circumference of the marginal zone. The central zone (A), marginal zone (B) and peripheral zone (C) of the front side (8) of the lens (6) may not coincide with the that of the back side (9) of the lens (6). That is, the relative diameters of the zones (A), (13) and (C), are likely different as between the front (8) and back (9) sides of the lens. Nonethless, for purposes of description, these zones have been indicated as being identical.

A connecting curve (D) is also shown on the back side (9) of lens (6), located between the marginal zone (B) and the peripheral zone (C). The connecting curve is a relatively small surface interconecting two adjacent surfaces. Connecting curves may be used on both the back and front sides for smoothing the transition between the various zones or curves within a zone.

The back side (9) of the subject lens comprises multiple surfaces described by portions of second-order surfaces of revolution other than spherical. Examples of preferred non-spherical conic sections are ellipsoids, hyperboloids or paraboloids. Preferred conic sections to be used with the respective zones are as follows: the central zone is preferably an ellipsoid; the marginal zone or zones are preferably hyperboloids; the peripheral zone is preferably a hyperboloid; and the optional (but preferred) connecting curve is preferably an ellipse or polynomial. (When a connecting curve has a spheric surface with an opposite curvature as the surfaces which it interconnects, the curve is commonly refererred to as a "fillet curve"). However, any combination of ellipses, hyperbolas, and parabolas may be used to create each zone and any connecting curves. In addition, the marginal and peripheral zones may be comprised of more than one aspherical curve. As will be apparent to those skilled in the art, multiple marginal and peripheral zones may be combined together to form the total periphery of the lens. It is preferred that the transitions between such zones are tangential.

With continued reference to the back side of the subject lens, the central zone (A) preferably comprises a surface defined by a segment of an ellipsoid of revolution, the generatrix of which is given by the equation:

$$Z = \frac{(CX^2)}{1 + \sqrt{(1 - (1 - K)C^2X^2)}} \quad \text{(EQ. 1)}$$

wherein Z is the saggital depth, X is the half diameter, C is 1/Ro (wherein Ro is the base curve radius of the central zone of the back side (9)), and K=–(e$^2$) (wherein e is the eccentricity of the ellipse).

The marginal zone (B) of the back side of the lens preferably comprises a surface defined by a segment of a hyperboloid of revolution, the generatrix of which is generated by the equation:

$$Z = \frac{(CX^2)}{1 + \sqrt{(1 - (1 - K)C^2X^2)}} + T \quad \text{(EQ. 2)}$$

wherein Z and X are as defined above, C is 1/Ro (wherein Ro is the peripheral radius of the marginal zone of the back side (9), K=–(e$^2$) (wherein e is the eccentricity of the marginal zone) and T is the hyperbolic offset.

The peripheral zone (C) of the back side of the lens preferably comprises a surface defined by a segment of a hyperboloid of revolution, the generatrix of which is given by equation 2 wherein Z and X are as defined above, C is 1/Ro (wherein Ro is the peripheral radius of the peripheral zone of the back side (9), K=–(e$^2$) (wherein e is the eccentricity of the peripheral zone) and T is the hyperbolic offset.

The connecting curve (D) is a curve placed at the points where the peripheral and outermost marginal zones come together. The connecting curve is preferably included to provide a lens with a smoother transition between the marginal and peripheral zones. The connecting curve (D) preferably has a surface defined by a segment of an ellipsoid of revolution, the generatrix of which is given by equation 1 wherein Z is the saggital depth, X is the half diameter, C is 1/Ro (wherein Ro is the central radius of the surface (D)), and K=–(e$^2$) (wherein e is the eccentricity of the ellipse). This surface of revolution for the connecting curve is selected so that it provides the desired smooth transition between the non-tangential surfaces, e.g. the central zone (A)—outermost marginal zone (B) and peripheral zone (C). Alternatively, the connecting curve may have a surface defined by a polynomial function, e.g. a cubic polynomial represented by equation 3:

$$y = Ex^3 + Fx + G \quad \text{(EQ. 3)}$$

wherein: x is the linear distance from the center of the lens, y is the sagital depth of the lens at a given x value, and E, F, and G are polynomial coefficients.

In a preferred embodiment of the present invention, the transition from the central zone (A) to the marginal zone (B) on the back side of the lens is tangential. More specifically, point (P) where the central zone ends and the marginal zone begins lies on a tangent common to the curves of both zones. A connecting curve as previously described with respect to reference letter D may be used at point P to provide a smooth transition between the central (A) and marginal (B) zones, if desired or deemed necessary.

With further reference to the back side of the subject lens, it is preferred that the axial edge lift of the central and marginal zones (A), (B) increases towards the edge of the lens. The axial edge lift of peripheral zone (C) decreases toward the edge of the lens. "Axial edge lift" (as used herein) is the distance between a point on the back surface of a lens at a specific diameter and a vertex sphere, measured parallel to the lens axis, the vertex sphere being a theoretical sphere having a radius of curvature equal to that at the direct geometric center of the lens.

With reference to the front side (8) of the subject lens, in one embodiment, the entire front side comprises multiple spherical surfaces. The central zone (A) of the front side (8) preferably includes a single spherical surface, whereas the marginal zone (B) zone preferably includes several spherical surfaces B1, B2, B3 for providing increasing plus power correction from the central zone (A) toward the peripheral zone (C). As no vision correction is provided in the peripheral zone (C), the number of curves provided in this zone is determined by manufacturing and comfort considerations. Furthermore, the curves in the peripheral zone (C) need not be spherical. Similarly, the connecting curves between the center (A) and marginal (B) zones need not be spherical, e.g. the connecting curves may be described by polynomial curves, or other non-spherical curves.

In order to reduce and/or avoid detectable "vision jumps" between spherical surfaces on the front side of the lens, the number of spherical surface on the front side of the lens should be limited to a few as is required for necessary vision correction. However, those skilled in the art will appreciate that some patients may have vision correction demands requiring balancing of fit, centering, and detectable "vision jumps". As indicated previously, connecting curves may also be used to improve fit by smoothing transitions between lens surfaces.

When fitting the lens of this invention, a trial lens method including a fluorescein assessment should be employed. With such a fitting method, the base curve radius of the first trial lens is chosen by measuring the corneal curvature and identifying the Flat K and the amount of corneal astigmatism. Preferably, the lenses of this invention may be provided with a base curve radius (Ro) from about 6.30 mm to 8.30 mm, generally in incremental steps of 0.05 mm or 0.10 mm. Outside diameters preferably range from about 8.2 mm to 10.5 mm, with the central zone (A) having a diameter preferably greater than the pupil diameter and less than 8.0.

By way of example, a representative lens of the subject invention may include a base curve radius of 7.3 mm and an outer diameter of 9.6 mm; and may be provided with the following back side dimensions: central zone (A) having a diameter of 7.0 mm, the base curve radius of 7.3 mm and constituted by a segment of an ellipsoid having an eccentricity of 0.75; marginal zone (B) having a diameter of 9.0 mm, a peripheral radius of 5.7 mm and constituted by a segment of a hyperboloid having an eccentricity of 1.5 and an offset of –0.11; a peripheral zone having a peripheral radius of 6.6 mm and constituted by a segment of a hyperboloid having an eccentricity of 0.083 and an offset of –0.34; with a front side having a central zone consisting of a single spherical curve having a diameter of about 4.0 mm and a marginal zone for providing plus power (up to about 1 diopter) and having a diameter of about 4 to 5 mm.

Lenses with other curves can be provided by one skilled in the art.

The present invention is not limited to the details of the illustrative embodiments provided herein. This invention may be embodied in other specific forms without departing from its essential attributes. The present embodiments are therefore to be considered as illustrative and not restrictive.

What is claimed is:

1. A multifocal contact lens having an edge, a front and back side and a plurality of concentrically arranged zones comprising a central zone, a peripheral zone and a marginal zone between said central zone and said peripheral zone, wherein each of the zones on the back side of the lens is defined by a second-order surface of revolution other than spherical, and wherein the marginal zone of the front side comprises at least two different spherical surfaces for providing multiple focal points and provide increasing plus power correction from the central zone toward the peripheral zone.

2. The lens of claim 1 wherein the central and marginal zones of the front side of the lens consist of only spherical surfaces.

3. The lens of claim 1 wherein the central and marginal zones of the back side of the lens have an axial edge lift which increases toward the edge of the lens.

4. The lens of claim 1 wherein the peripheral zone on the back side of the lens has an axial edge lift which decreases toward the edge of lens.

5. The lens of claim 1 wherein the transition between the central zone and marginal zone on the back side of the lens is tangential.

* * * * *